Oct. 28, 1947.    J. E. TARR    2,429,651
CONTROL SYSTEM FOR TWO-PHASE INDUCTION MOTORS
Filed Jan. 1, 1945
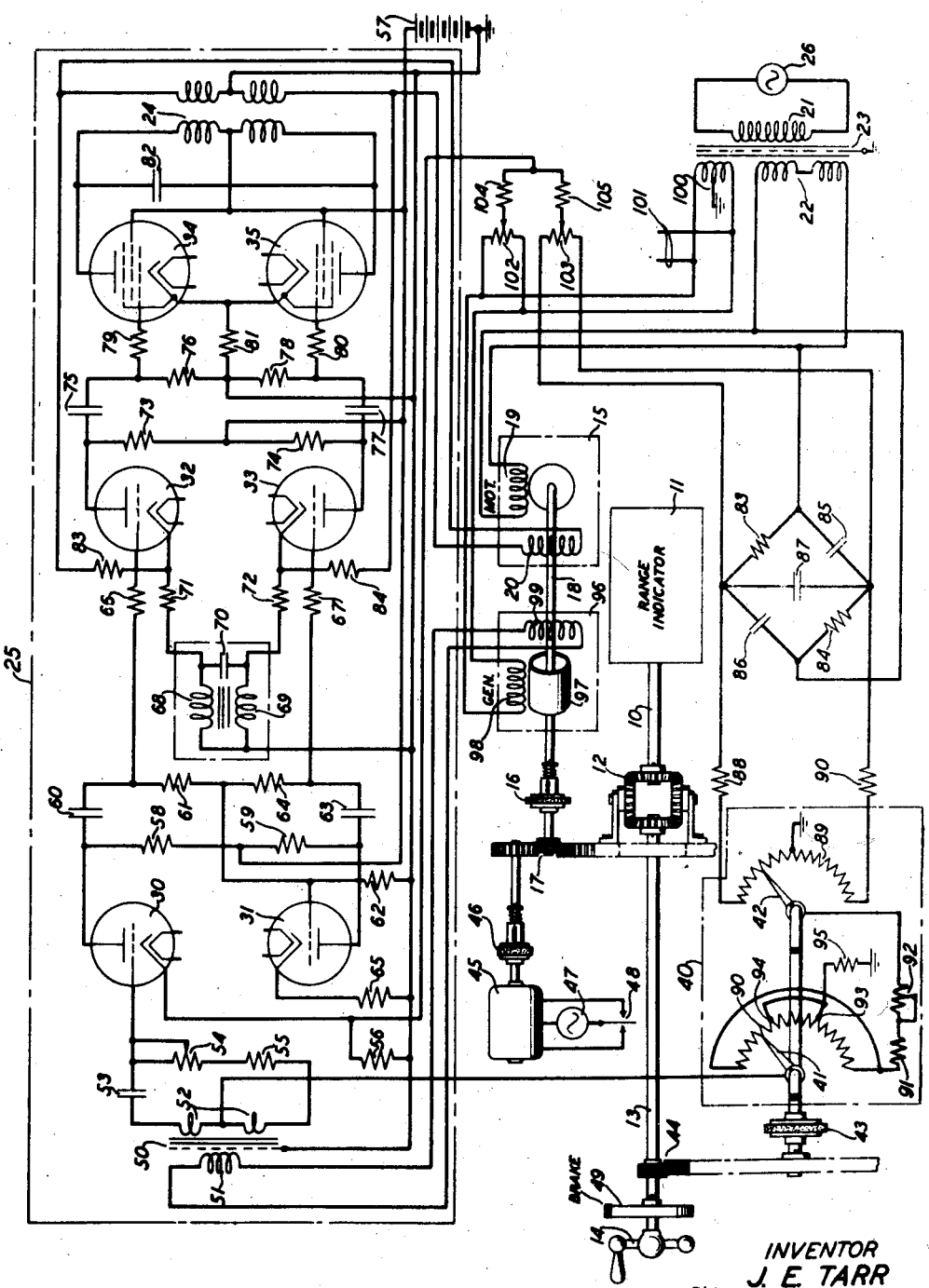
INVENTOR
J. E. TARR
BY
G. F. Heuerman
ATTORNEY Patented Oct. 28, 1947

2,429,651

UNITED STATES PATENT OFFICE 2,429,651

CONTROL SYSTEM FOR TWO-PHASE INDUCTION MOTORS

James E. Tarr, Madison, N. J., assignor to Bell Telephone Laboratories, Incorporated, New York, N. Y., a corporation of New York Application January 1, 1945, Serial No. 570,877

13 Claims. (Cl. 172—274)

This invention relates to control apparatus and particularly to apparatus for controlling a device for continuously producing an indication of the position of a distant object or target which may be moving at a varying rate.

An object of the invention is to provide novel apparatus for controlling the angular velocity and phase of a controlled or output shaft in response to the angular displacement of an input or controlling shaft.

Another object of the invention is to provide means for reducing or eliminating voltage components which are set up in the output winding of an induction generator due to the coupling between the generator exciting and output windings independently of the presence of the generator rotor.

In a copending application of E. B. Ferrell, Serial No. 523,717, filed February 24, 1944, there is disclosed a tracking system for continuously indicating the position of a target with respect to each of three coordinates, namely, elevation, azimuth and range. In that system pulses of radio frequency energy are radiated from a directional antenna and pulses which reach the target are reflected therefrom and picked up by the antenna. Motors are provided for driving the antenna about horizontal and vertical axes, respectively, so that when the radiated beam reaches a target the angular displacement of the one motor shaft from a reference position is a measure of the elevation of the target and the displacement of the other motor shaft from a reference position is a measure of the azimuth of the object. A third motor is provided for driving the shaft of an apparatus for indicating the range of the object, such as disclosed in a copending application of L. A. Meacham, Serial No. 505,024, filed October 5, 1943 (now Patent No. 2,422,205, granted June 17, 1947), the angular displacement of the shaft from a reference position being a measure of the range indication produced.

The present invention relates to tracking apparatus of the type disclosed in said application, Serial No. 523,717, and, in the specific embodiment of the invention herein shown and described for the purpose of illustration, there is provided apparatus for controlling the angular displacement of the shaft of a range indicator in response to the displacement of a manually controlled shaft from a reference position. The range indicator shaft, or output shaft, is angularly displaced proportionately to hand-wheel shaft displacement due to the mechanical coupling of the two shafts. The range indicator shaft is also driven by a two-phase induction motor at a speed determined by the voltage impressed upon one of its windings from the output of an amplifier, the second motor winding being energized by current from an alternating current supply source. One of the components of the voltage impressed upon the amplifier input circuit is obtained from a potentiometer to which current is supplied from the alternating current supply source and the shaft of which is coupled to the hand-wheel shaft so that the amplitude of this voltage component varies with the hand-wheel shaft displacement and so that the phase of the voltage component is reversed in response to a reversal of the displacement of the hand-wheel shaft from a reference position at which the voltage component has zero amplitude. An induction generator of the spinner type, the rotor of which is driven by the motor generates an alternating voltage proportional to the speed of the range indicator shaft, alternating voltage from the supply source being supplied to the generator exciting winding. The output voltage of the generator is also impressed upon the amplifier input circuit in phase opposition to the potentiometer voltage so that the resultant amplifier input voltage is equal to the difference of the potentiometer and generator voltages. The potentiometer and generator voltages are large compared with the difference of the two voltages and, since the generator voltage is a linear function of the motor shaft speed, the motor speed is substantially a linear function of the potentiometer voltage even though the relationship between the resultant difference voltage applied to the amplifier input and the motor speed is extremely non-linear. Due to the use of the feedback voltage from the generator to the amplifier input circuit, the speed of the motor is substantially independent of load over an operating range of loads.

The phase of the amplifier input voltage is such that the voltage impressed upon the control field winding of the motor leads or lags by 90 degrees the voltage from the supply source impressed upon the fixed field winding of the motor to cause the rotor of the motor to revolve in one direction or the other depending upon the direction of the displacement of the hand-wheel shaft from a reference position for which the potentiometer voltage supplied to the amplifier input is zero. To reduce or substantially prevent phase changes of the generator output voltage due to changes of generator speed, the rotor of the generator is made of a conducting material the resistivity of which is of the order of ten to forty times that of copper, for example, nickel-silver or Nichrome, the resistivities of which are about twenty and forty times that of copper, respectively. It has been found that the use of such a rotor material reduces the efficiency of the generator to such an extent that an out-of-phase voltage component introduced into the generator output circuit due to the coupling between the exciting and output windings becomes troublesome. Means are therefore provided for balancing out this component in the amplifier input circuit. The phase of the out-of-phase component is such that the balancing voltage required is the vector sum of two quadrature voltage components derived from the alternating current supply source.

The invention will now be described with reference to the accompanying drawing the single figure of which is a diagrammatic view of control apparatus embodying the invention.

The shaft 10 of the range indicator 11 is coupled through a differential gear 12 to a shaft 13 to which a hand-wheel 14 is secured so that, due to this mechanical coupling, the shaft 10 is angularly displaced in proportion to the angular displacement of the hand-wheel shaft 13. The shaft 10 is also driven by a two-phase, squirrel-cage induction motor 15 through a clutch 16 and gearing 17 at a speed proportional to the motor speed. There is provided for the motor a fixed field winding 19 and a control field winding 20. There is supplied to the winding 19 alternating current from the supply source 26, having a frequency of 60 cycles per second, for example, through primary winding 21 and secondary winding 22 of a transformer 23. Alternating current in phase quadrature with respect to the current supplied to winding 19 is supplied to the control field winding 20 from the secondary winding of the output transformer 24 of an amplifier 25 comprising electronic tubes 30, 31, 32, 33, 34 and 35, a rotating magnetic field being set up due to the energization of windings 19 and 20 to cause the rotation of the motor shaft 18 in one direction or the other depending upon whether the current in winding 20 leads or lags the current in winding 19. The input voltage of the amplifier 25 has a plurality of components such that the motor speed is proportional to one of the voltage components which is derived from a potentiometer 40 the brush arms 41 and 42 of which are coupled through clutch 43 and gearing 44 to the hand-wheel shaft 13. A displacement of the hand-wheel shaft from an initial or reference position thus causes the range indicator shaft 10 to be driven in a direction determined by the direction of displacement of the hand-wheel shaft at a rate proportional to the voltage set up by the potentiometer 40, which is a function of the hand-wheel shaft displacement, and, in addition, causes a displacement of shaft 10 proportional to the displacement of the hand-wheel shaft 13 due to the mechanical coupling through differential gear 12. There is also provided a reversible induction motor 45 coupled to shaft 10 through clutch 46 and gearing 17 for driving the shaft 10 in either direction at a relatively high speed, the motor being energized by current from an alternating current supply source 47 upon closure of a three-position self-restoring, normally open switch 48. A handwheel brake 49 is provided to prevent the hand-wheel shaft from being driven by motors 15 or 45 through the differential gear 12.

The amplifier 25 is provided with an input transformer 50, having a primary winding 51 and a secondary winding 52, and a phase correcting network comprising a condenser 53, adjustable resistor 54 and fixed resistor 55 in series connected across the secondary transformer winding 52, the common terminal of condenser 53 and resistor 54 being connected to the control grid of amplifier tube 30. The mid-terminal of secondary transformer winding 52 is connected to the brush arm 41 of potentiometer 40 and thence through a resistive path to ground, as will later be described, and the control grid-cathode circuit of tube 30 is completed from the cathode of the tube through resistor 56 to ground. Anode current is supplied to tube 30 from direct current source 57, having its negative terminal grounded, through a resistor 58 and to tube 31 through a resistor 59. An alternating current path is provided from the anode of tube 30 through condenser 60, resistor 61 and resistor 62 in series to ground. An alternating current path is also provided from the anode of tube 31 through condenser 63, resistor 64 and resistor 62 in series to ground. The cathode of tube 31 is connected through a resistor 65 to ground and the control electrode of tube 31 is connected through resistor 62 to ground. It will be seen that an alternating current is caused to flow in the circuit comprising condenser 60 and resistors 61 and 62 in response to an alternating voltage impressed upon the control electrode-cathode circuit of tube 30. The resulting alternating voltage drop across resistor 62 is impressed upon the control electrode-cathode circuit of inverter tube 31 to cause alternating current to flow in the path comprising condenser 63 and resistors 64 and 62. The circuit elements, specifically resistors 61 and 64, are so chosen that the input voltage for the push-pull amplifier stage comprising tubes 32 and 33 is balanced with respect to ground, that is, the voltage drops across resistors 61 and 64 are equal at any instant, the upper terminal of resistor 61, as viewed in the figure, being positive when the lower terminal of resistor 64 is negative each with respect to the potential of the common terminal of the resistors, and vice versa.

The upper terminal of resistor 61 is connected through a resistor 66 to the control electrode of tube 32 and the lower terminal of resistor 64 is connected through a resistor 67 to the control electrode of tube 33. For suppressing the third harmonic of the frequency of power source 26, that is, 180 cycles if the power source fundamental frequency is 60 cycles per second, there is provided a network comprising inductive windings 68 and 69 of a reactor and a condenser 70, the common terminal of windings 68 and 69 being connected to ground. The cathode of tube 32 is connected through a resistor 71 to the common terminal of windings 68 and condenser 70 and the cathode of tube 33 is connected through a resistor 72 to the common terminal of winding 69 and condenser 70. Anode current is supplied from direct current source 57 to tube 32 through a resistor 73 and to tube 33 through a resistor 74. The alternating current output path for tube 32 may be traced from the anode of tube 32 through a condenser 75 and a resistor 76 to ground and the corresponding path for tube 33 may be traced from the anode of the tube through a condenser 77 and a resistor 78 to ground.

The common terminal of the condenser 75 and resistor 76 is connected through a resistor 79 to the control electrode of tube 34, the common terminal of condenser 77 and resistor 78 is connected through a resistor 80 to the control electrode of tube 35 and the common terminal of resistors 76 and 78 is connected through a resistor 81 to the cathodes of tubes 34 and 35. The screen grids of tubes 34 and 35 are directly connected to the positive terminal of direct current source 57 and this positive terminal is also connected to the mid-terminal of the primary winding of transformer 24 the end terminals of which are connected to the anodes of tubes 34 and 35, respectively, to complete anode current paths for the tubes. A condenser 82 is connected across the primary winding of output transformer 24 for the purpose of correcting the power factor of the load comprising motor winding 20 and the output transformer 24 presented to the output of amplifier tubes 34 and 35, thus improving the operating efficiency. The mid-terminal of the secondary winding of transformer 24 is connected to ground and its end terminals are connected to the terminals respectively of winding 20 of motor 15. A two-stage negative feedback is provided by connecting the upper terminal of the secondary winding of transformer 24 through a resistor 83 to the common terminal of resistor 71 and the cathode of tube 32 and by connecting the lower terminal of the transformer winding through a resistor 84 to the common terminal of resistor 72 and the cathode of tube 33. The network 68, 69, 70 is anti-resonant to the 180-cycle component so that there is produced across the windings 68 and 69, respectively, of the network 180-cycle voltage components which oppose the 180-cycle voltage components impressed upon the control grid-cathode circuits of tubes 32 and 33, respectively, from the output circuit of tubes 30 and 31.

Alternating current is supplied from the secondary winding 22 of transformer 23 through a phase shifting network comprising resistors 83 and 84 and condensers 85, 86 and 87 which shifts the phase of the voltage supplied from potentiometer 40 to the input circuit of amplifier 25 so that the phase of the voltage applied to motor winding 20 from the amplifier output circuit is in phase quadrature with respect to the voltage impressed upon winding 19 directly from the transformer winding 22. One output terminal of the phase shifting network is connected through a resistor 88 to one end terminal of resistance winding 89 of potentiometer 40. The other output terminal of the network is connected through a resistor 90 to the other end terminal of winding 89 and the mid-terminal of winding 89 is grounded. Each of the end terminals of resistance winding 90 of potentiometer 40 is connected through a resistor 91 and an adjustable resistor 92 to the brush arm 42. Two taps 93 and 94 of resistance winding 90 on opposite sides, respectively, of the mid-point of the winding and equally spaced therefrom are connected through a resistor 95 to ground. The brush arm 41 is connected to the mid-tap of transformer winding 52 so that the voltage measured between the point of resistance winding 90 with which the brush carried by arm 41 makes contact and ground is impressed upon the control electrode-cathode circuit of amplifier tube 30.

When the brushes carried by arms 41 and 42 contact the mid-points of windings 90 and 89, respectively, the voltage between brush arm 42 and ground is zero, no current flows in the circuit comprising resistors 92, 91, resistance winding 90, and resistor 95, and therefore the voltage between brush arm 41 and ground is zero. When the hand-wheel 14 is rotated in a certain direction to angularly displace the hand-wheel shaft 13, the voltage between brush arm 42 and ground is increased in proportion to the displacement. When the hand-wheel is rotated to displace the shaft in the opposite direction from the initial or reference position for which zero voltage is set up and impressed upon the amplifier input circuit by the potentiometer, the phase of the voltage is reversed or shifted by 180 degrees. When the hand-wheel shaft displacement is relatively small so that brush arm 41 makes contact with portions of resistance winding 90 between the taps 93 and 94, the voltage impressed upon the amplifier input circuit from the potentiometer 40 is proportional to hand-wheel displacement. This voltage is equal to the voltage drop from the arm 42 to ground multiplied by the ratio of the resistance of resistor 95 to the total resistance of the current path, comprising resistors 92, 91, winding 90, and resistor 95, which is in shunt with the portion of winding 89 between ground and the point with which the brush arm 42 makes contact. For larger displacements of the hand-wheel shaft such that the brush arm 41 contacts portions of winding 90 between tap 93 or 94 and an end terminal of the winding 90, the rate of change of the voltage set up between potentiometer arm 41 and ground with respect to hand-wheel shaft displacement is no longer constant but increases with hand-wheel shaft displacement. This is due to the change of resistance between potentiometer arm 41 and ground caused by the displacement of the hand-wheel shaft.

The motor 15 drives the rotor of an induction generator of the spinner type. The generator comprises an exciting winding connected to the end terminals of secondary winding 100 of transformer 23 the mid-terminal of which is connected to ground. This transformer winding may also supply current to the cathode heater filaments of tubes 30, 31, 32, 33, 34 and 35 by connecting the filaments to the leads 101. The generator also comprises an output winding 99 the terminals of which are connected to the terminals of primary winding 51 of transformer 50. The cup-shaped rotor 97 of the generator is made of a conducting material having a resistivity of the order of ten to forty times that of copper, for example, nickel-silver, the resistivity of which is about twenty times that of copper, or nichrome, the resistivity of which is about thirty-five times that of copper. It has been found that by constructing the rotor of a material of relatively high resistivity, phase changes of the generator output voltage when the rotor speed changes are reduced or substantially prevented. This may be explained, it is believed, by the following facts. When the rotor 97 is stationary the frequency $f$ of the current induced in the rotor is equal to the frequency of the current from source 26 flowing through the exciting winding 98, 60 cycles per second, for example. If the rotor is driven at a speed of $f'$ revolutions per second, the current in the rotor has frequency components of $f+f'$, and $f-f'$ cycles per second. If the rotor is driven at a speed of 60 revolutions per second, for example, the rotor current will have a direct or zero frequency component and a component of 120 cycles per second. The current path in the rotor has inductance and resistance so that the impedance of the path, and therefore the amplitude of the current flowing in the rotor, will vary with frequency and therefore with the rotor speed. These current variations cause the phase of the generator output voltage to vary. Increasing the ratio of resistance to inductance of the rotor current path reduces the impedance changes of the path and therefore amplitude changes of the current in the path when the frequencies of the so-called sideband components change in response to changes of rotor speed. Increasing the resistivity of the rotor material thus has the desired effect of reducing or tending to prevent phase changes of the generator output voltage in response to speed changes of the rotor but it also has the undesired effect of reducing the generator output voltage. It has been found that the use of a rotor material having a resistivity of ten to forty times that of copper will reduce phase variations of the generator output voltage due to speed changes to a desired extent without reducing the efficiency of the generator below a satisfactory value.

It has been found, moreover, that reducing the efficiency of the generator by increasing the resistivity of the rotor material has the undesired effect of increasing the ratio of an undesired, out-of-phase voltage component introduced into the output winding 99 due to the direct coupling between that winding and the exciting winding 98 independently of the presence of the rotor 97 to the voltage induced in the winding 99 due to the current in the rotor. This undesired or direct coupling component was found to be out of phase with the voltage due to the generator action by a phase angle other than 90 degrees or 180 degrees so that it could not be balanced out by the use of a voltage obtained from the transformer winding 100 which supplies current to the generator exciting winding or by the use of a quadrature voltage obtained from the phase shifter 83—87. It was found that the undesired component which we may call the "direct coupling component" could be balanced out by the use of two voltages in quadrature with respect to each other and of suitable relative amplitudes, the one voltage being obtained from the secondary transformer winding 100 and the other from the phase shifter 83—87. The phase of the direct coupling component with respect to the generated voltage differs somewhat for different generators manufactured according to the same specifications so that the amplitudes of the quadrature voltages used for balancing out the undesired component must be adjusted for a particular generator. It appears that the direct coupling between the windings 98 and 99 comprises not only the mutual inductance of the windings but also the distributed capacitance between the windings and the resistance paths between the windings.

For balancing out the out-of-phase component which is introduced from the generator output winding through transformer 59 into the control grid-cathode circuit of amplifier tube 30, there is provided in said grid-cathode circuit a resistor 56 to which current is supplied, and across which a voltage is therefore produced, for balancing out the out-of-phase component. The circuit for supplying this current to resistor 56 comprises potentiometers 102 and 103 having adjustable contacts which are connected through resistors 104 and 105, respectively, to that terminal of the resistor 56 which is directly connected to the cathode of tube 30, the other terminal of resistor 56 being connected to ground. The terminals of the resistance winding of potentiometer 102 are connected respectively to the end terminals of secondary transformer winding 100, the mid-terminal of which is grounded. The terminals of the resistance winding of potentiometer 103 are connected respectively to the output terminals of phase shifter 83—87 the input terminals of which are connected to the secondary transformer winding 22, one output terminal of the phase shifter being connected through resistor 88 and a half of potentiometer winding 89 to ground, and the other output terminal of the phase shifter being connected through resistor 90 and the other half of winding 89 to ground.

There is thus supplied to the input of the amplifier 25 the vector sum of two alternating voltage components the frequency of each of which is the frequency of the supply source 26. One of the voltage components is that obtained from the potentiometer 40 and it varies with the handwheel shaft displacement. The second alternating voltage component applied to the amplifier input circuit, that obtained from the generator 96, is proportional to the speed of motor 15, this second voltage component being of smaller amplitude than, and opposed in phase with respect to, the first voltage component. The relationship between motor speed and the resultant amplifier input voltage is extremely non-linear and is identical to the usual speed-voltage characteristic of an induction motor. The generator voltage, however, is a linear function of speed and, since the generator voltage and the potentiometer voltage are very large, relative to the resultant amplifier input voltage, the potentiometer voltage is substantially linear with respect to the generator voltage even though the difference in these two voltages is quite non-linear with respect to the generator voltage. Consequently, the speed of the motor is a linear function of the potentiometer voltage. The speed of motor 15 is also substantially independent of load since an extremely small change of speed caused by a change in load will cause the generator voltage to change by such an amount that a large change in amplifier output takes place. The resulting voltage change applied to motor winding 20 is such as to minimize or substantially prevent changes of motor speed as the result of changes of load.

What is claimed is:

1. Means for controlling the speed of an induction motor having a first and a second phase winding comprising means for supplying current from an alternating current supply source to said first phase winding, a circuit having its output connected to the second phase winding of said motor for supplying alternating current thereto under control of an alternating voltage having a plurality of components applied to the input of said circuit, an induction generator having a rotor driven by said motor, an exciting winding to which current is supplied from said supply source and an output winding connected to the input of said circuit for supplying one of said component voltages thereto, the output voltage of said generator having a direct coupling component set up therein as a result of the coupling between the exciting and output windings independently of the presence of the rotor of the generator, and means for applying to the input of said circuit a balancing voltage component equal in amplitude and opposite in phase to said direct coupling component for balancing out said direct coupling component.

2. Apparatus in accordance with claim 1 in which said last-mentioned means comprises means for deriving from said supply source and for combining two quadrature voltages for setting up said balancing voltage component.

3. Apparatus in accordance with claim 1 in which the rotor of said generator has a resistivity from ten to forty times that of copper.

4. Apparatus in accordance with claim 1 in which the rotor of said generator consists of a nickel-silver alloy having a resistivity of the order of twenty times that of copper.

5. In combination an induction generator comprising an exciting winding, an output winding and a current conducting rotor the resistivity of which is ten to forty times that of copper, means for supplying current from an alternating current supply source to said exciting winding, a motor for driving the rotor of said generator to cause to be induced in said output winding an output alternating voltage which varies with the speed of said rotor, the phase of said output voltage being substantially independent of rotor speed because of the relatively high resistivity of said rotor, the ouput voltage of said generator being relatively low because of the high resistivity of said rotor so that an out-of-phase voltage component set up in said output winding due to the direct coupling of said output and exciting windings independently of the presence of said rotor is of considerable magnitude relative to the magnitude of the output voltage component due to the current flowing in the rotor, said motor comprising a winding upon which a voltage may be impressed for controlling its speed, an amplifier having an input and an output, means for connecting said amplifier output to said motor winding, means for impressing a control voltage upon the input of said amplifier for controlling the amplifier output voltage, said last-mentioned means comprising means for connecting said generator output winding to the input of said amplifier, and means for impressing upon said amplifier input a voltage for balancing out said out-of-phase component and thereby preventing its amplification by said amplifier.

6. A combination in accordance with claim 5 in which said last-mentioned means comprises means for deriving from said supply source two component voltages of adjustable magnitude and substantially 90 degrees out-of-phase with respect to each other and means for combining said component voltages to produce a resultant voltage which is impressed upon said amplifier input.

7. The combination with an amplifier having an input circuit and an output circuit of an induction generator comprising a current conducting rotor having a resistivity ten to forty times that of copper, an output winding and an exciter winding, a motor for driving said rotor, means for connecting said output winding to said amplifier input circuit, an alternating current supply source, means for supplying alternating current from said supply source to said exciter winding to set up a magnetic field for causing current to flow in said rotor and thereby to cause an output voltage to be induced in said output winding due to the field set up by the current flowing in said rotor, an out-of-phase voltage component being set up in said output winding due to the coupling of said exciter and output windings independently of the current in said rotor, the increase in resistivity of said rotor relative to that of copper causing phase variations of said output voltage in response to speed changes of said rotor to be reduced or substantially eliminated, said increase in resistivity also causing a reduction of the efficiency of said generator with the result that the ratio of said out-of-phase component to said output voltage is increased, means for deriving from said supply source and for impressing upon said amplifier input circuit a voltage having a component equal in amplitude and opposite in phase to the out-of-phase voltage component in said amplifier input circuit to balance out said out-of-phase voltage component in said input circuit, thereby preventing the amplification of said out-of-phase component and means for connecting said motor to the output circuit of said amplifier to control the speed of said motor.

8. The combination in accordance with claim 7 in which said last-mentioned means comprises means for deriving a first voltage from said supply source, means for deriving from said supply source a second voltage substantially in phase quadrature with respect to said first voltage and means for combining said first and second voltages to set up a resultant voltage which is impressed upon said amplifier input circuit.

9. A combination in accordance with claim 7 in which the rotor of said generator consists of a nickel-silver alloy having a resistivity of about twenty times that of copper.

10. The combination of an amplifier having an input circuit and an output circuit, an induction motor having a rotor and a first and a second phase winding for setting up a rotating magnetic field for causing the rotation of said rotor in response to currents supplied to said windings, an alternating current supply source, means for supplying current from said source to said first winding, means for connecting said second motor winding to said amplifier output circuit for causing to be supplied thereto under control of voltage impressed upon said amplifier input circuit current which is 90 degrees out-of-phase with respect to the phase of the current supplied to said first winding, means for deriving from said supply source and for impressing upon said amplifier input circuit a control voltage, an induction generator comprising a rotor driven by said motor, an exciting winding and an output winding, means for supplying alternating current from said supply source to said generator exciting winding to cause to be induced in said output winding in response to the current induced in said rotor an alternating voltage the amplitude of which varies with the speed of said motor, means for connecting said generator output winding to said amplifier input circuit for causing to be impressed thereon a voltage opposed in phase to said control voltage, thereby causing the speed of said motor to vary as a substantially linear function of said control voltage, an out-of-phase voltage component being set up in said generator output winding due to the coupling between said output winding and said exciter winding independently of the current in said rotor, and means for deriving from said supply source and impressing upon said amplifier input circuit a voltage equal to and opposing said out-of-phase voltage component to prevent the amplification of said out-of-phase component by said amplifier.

11. A combination in accordance with claim 10 in which said last-mentioned means comprises means for deriving from said supply source two quadrature voltages, means for adjusting the magnitudes of said voltages respectively and means for combining said voltages to produce a summation voltage which is impressed upon said amplifier input circuit.

12. A combination in accordance with claim 10 in which means are provided for varying said control voltage in response to the angular displacement of an input shaft, thereby controlling the angular velocity of the shaft of said motor.

13. In combination, a motor having an output shaft and a plurality of windings, an alternating current supply source for supplying alternating current to one of said windings, an amplifier for supplying alternating current to the other of said windings for controlling the speed and direction of rotation of said output shaft under control of a resultant voltage impressed upon the amplifier input circuit, an input shaft, means for deriving from said supply source and impressing upon said amplifier input circuit a first alternating voltage the phase of which is dependent upon the direction of angular displacement of said input shaft from a reference position and the amplitude of which varies with said displacement, an induction generator having a rotor driven from said output shaft, an exciting winding to which current is supplied from said current source and an output winding for supplying to said amplifier input circuit a second voltage opposite in phase to said first voltage and having an amplitude which varies with speed changes of said output shaft, means for deriving from said supply source and impressing upon said amplifier input circuit a voltage equal in amplitude and opposed in phase to an out-of-phase voltage component introduced into said input circuit from said generator output winding, said component being introduced into said output winding as a result of the direct coupling between said output and exciting windings independently of the presence of said rotor, and means for mechanically coupling said input and output shafts for angularly displacing said output shaft in proportion to the displacement of said input shaft, said displacement being in addition to the displacement of said output shaft produced by said motor when energized from said amplifier.

JAMES E. TARR.

REFERENCES CITED

The following references are of record in the file of this patent:

UNITED STATES PATENTS

| Number | Name | Date |
| --- | --- | --- |
| 2,311,340 | Kennedy | Feb. 16, 1943 |
| 2,312,275 | Ohlsen | Feb. 23, 1943 |
| 715,545 | Bradley | Dec. 9, 1902 |
| 718,083 | Bradley | Jan. 13, 1903 |
| 2,276,057 | McCormick | Mar. 10, 1942 |
| 2,330,648 | Warner | Sept. 28, 1943 |